Oct. 24, 1939.                G. FLEISCHEL                2,177,428
            CONTROL DEVICE FOR VARIABLE RATIO TRANSMISSIONS
                         Filed Feb. 28, 1938
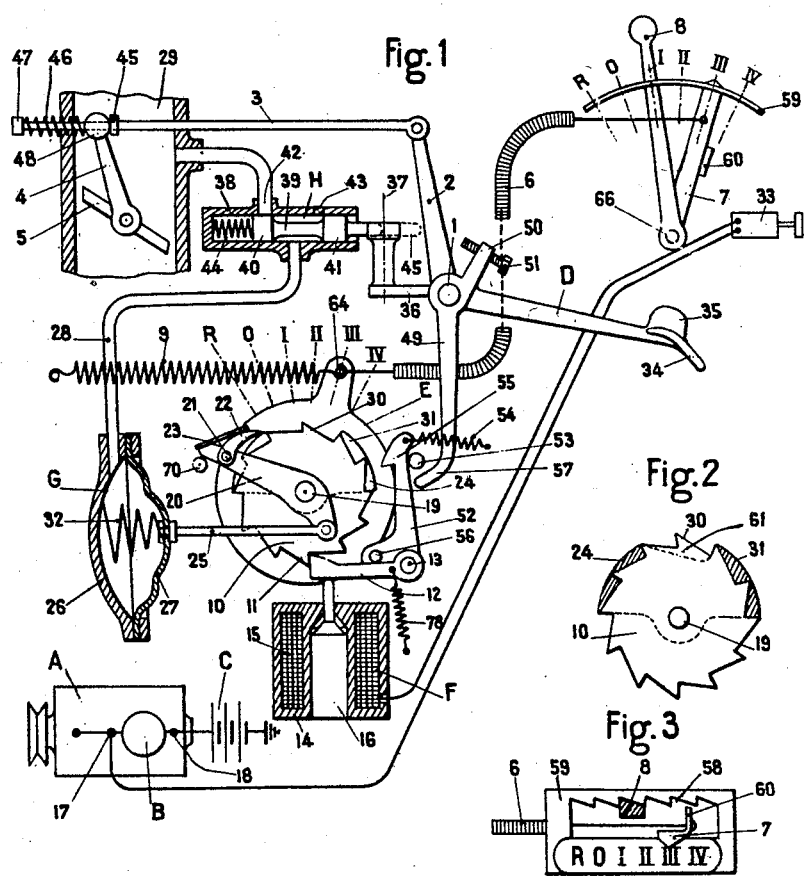
Inventor:
Gaston Fleischel,
Bailey L Carson
Attorneys Patented Oct. 24, 1939

2,177,428

UNITED STATES PATENT OFFICE 2,177,428

CONTROL DEVICE FOR VARIABLE RATIO TRANSMISSIONS

Gaston Fleischel, Bleneau, France

Application February 28, 1938, Serial No. 193,172
In France March 9, 1937

18 Claims. (Cl. 74—472)

The present invention relates to control devices for variable ratio transmissions, and especially, although not exclusively, those for transmissions of automobile vehicles and the like, of the type in which modifications of the ratio of transmission are controlled through the member or part which regulates the amount of power developed by the engine, this member being, as a rule, the throttle pedal or the throttle lever.

In my prior Patent No. 2,051,553, filed July 6, 1934, I described a control device of this kind in which the change of gear ratio is produced by a servo-motor.

The object of the present invention is to provide a control device of the type above referred to which is simpler than the device described in my prior patent above referred to and in particular which does not require the action of an external source of energy such as said servo-motor, or at least greatly reduces the action of such an external source of energy.

Another object of the present invention is to provide a control device adapted to utilize the usual means provided on automobiles or similar vehicles as the functional factors of the engine which cooperate, if need be, with the throttle for modifying the gear ratios.

It is thus possible to reduce the degree of the changes to be made in an ordinary vehicle.

The chief characteristic of the present invention lies in the fact that the member which controls the values of the ratio of transmission, and upon which the throttle, or equivalent member is to act, cooperates with a return device, such as a spring, which tends to bring it into one of its extreme positions, the action of said return device being normally neutralized by a stopping mechanism, adapted to act only in one direction, responsive to variations of the speed of the engine (for instance through the intermediate of the output of the dynamo), whereby this stopping action ceases when the speed of the engine drops below a predetermined value.

Another characteristic of the invention is that the driver can render inoperative, for instance near one of the limit positions of the throttle, the action of said stopping device, this action being preferably only partial.

Still another characteristic of the invention is that, if an increase of the ratio of transmission, that is to say a changing to a higher gear, is produced through the action of an external energy, the reduction of this ratio brings into play no energy other than the effort exerted by the driver.

Still another characteristic of the invention is that the lever for controlling the ratio of transmission, which can be maintained if necessary in my device, for passing to forward gear, reverse gear, or neutral, is adapted to act as a stop mechanism for the control device actuated by the throttle against the return mechanism, in such manner as to limit, at the driver's will, the number of characteristic positions that can temporarily be employed.

Still another characteristic of the invention is that the piece, connected with the member which controls the ratio of transmission, which cooperates as a stop with the hand operated lever, is arranged to act as an indicator of the value of the ratio of transmission which is being used.

Still another characteristic of the invention is that, while the changing to a lower gear is produced by depressing the throttle pedal (during what can be called a secondary stroke thereof) for instance beyond the position which corresponds to the engine developing its full power, which corresponds to a natural movement of the driver, the changing to a higher gear can be obtained only by a special movement of the throttle, which is given a particular disposition for this purpose.

Other features of the present invention will result from the following detailed description of some specific embodiment thereof.

Preferred embodiments of the present invention will be hereinafter described, with reference to the accompanying drawing, given merely by way of example, and in which:

Fig. 1 shows, partly in section and partly in elevation, a general embodiment of the control device according to the invention;

Fig. 2 is a detail view corresponding to a part of the mechanism;

Fig. 3 relates to the arrangement of an auxiliary control lever and of the indicator of the gear ratio that is being used;

Fig. 4 shows a modification of the device according to the invention;

Figs. 5 and 6 show arrangements of control of a particular member.

The invention of course applies to any kind of transmission, as explained in my prior patent above referred to. For the sake of simplicity, I will deal, in this case, merely with transmissions (the gear ratio of which varies either in a continuous or a discontinuous manner) in which passing from one gear to another one is obtained solely by the displacement by the driver of a single control member (for instance a lever or a handle) which, placed in characteristic positions, determines for each of them a particular ratio of transmission. This is, for instance the case of most of the continuous variation transmissions and of the electro-magnetic or hydraulic transmissions.

The manner of action on the transmission of the member for controlling the value of the transmission ratio is known. It is therefore unnecessary to describe the transmission itself.

Fig. 1 shows, by way of example a general view of an embodiment of my invention.

The member which controls the value of the ratio of transmission is shown at E. Its operating lever 64 can take a plurality of characteristic positions, to wit R, O, I, II, III, IV, corresponding to the various ratios of transmission, if the transmission includes a limited number of distinct ratios. If the transmission were of the continuous variation type, these characteristic positions might be as many as it is desired, and R and IV would be the positions of the control member corresponding to the extreme ratios. It will be supposed that, in all cases, R corresponds to reverse gear, O to neutral, and I, II, III, IV to the forward gear ratios.

The dynamo which supplies the ignition current and the lighting current is permanently driven by the engine of the vehicle and it is shown at A, with its make-and-break B.

At C, I have shown the storage battery of the vehicle.

The throttle pedal D is mounted, in the usual manner, in such manner as to pivot about spindle 1. It is, for instance, rigid with lever 2 which, through connecting rod 3 and lever 4, actuates the carburetter throttle valve 5, or in a general manner, the part which regulates the power required from the engine.

According to the present invention, the elements above mentioned are arranged as follows, this specific arrangement being given merely by way of example:

First, I arrange, in connection with the transmission control member E, a return spring 9 which tends constantly to bring it toward the extreme position R, and a stopping device acting in opposition to spring 9 and which may have its action limited either to a single direction of movement or in magnitude, provided that the limit value is higher than the action of spring 9. This stopping mechanism is for instance made as follows:

On any part which moves together with control member E, I provide, for instance concentrically thereto, a ratchet wheel 10, the teeth of which, such as 11, are of a length corresponding to the angular interval between two characteristic positions, and of an inclination such that a pawl 12, pivoted about stationary axis 13, can neutralize, tooth after tooth, the action of spring 9. This pawl is maintained out of contact with wheel 10 by a spring 78. But an electro-magnet F, of a strength higher than that of spring 78 is capable of engaging the pawl into the teeth of the wheel as soon as a sufficient current is sent through its winding. This electro-magnet F includes, in the usual manner, a soft iron part 14, containing a winding 15 which attracts the soft iron core 16 when the current flows through said winding. The end of this core 16 comes to push pawl 12. The winding of the electro-magnet is fed with current by dynamo A. However the feed circuit starts from point 17, located on the dynamo before the make-and-break B, therefore on the other side of the connection 18 thereof with the storage battery. This circuit may further be controlled by a switch such as 33, if necessary. Under these conditions, as long as the dynamo does not rotate quick enough for producing the normal current, the winding is fed with only a low current and its action is insufficient for overcoming the resistance of spring 78. But above a certain speed of revolution of the engine, corresponding to connection of the dynamo with the battery, the winding comes into play and causes pawl 12 to be engaged in the teeth of wheel 10.

The operation of this part of the mechanism therefore takes place as follows:

As long as the engine runs, as is normal during the displacement of the vehicle, at a speed higher than the idling speed, pawl 12, applied by electro-magnet F fed by the circuit of the dynamo, maintains the existing ratio of transmission brought into play by the parts which will be hereinafter described.

But if the engine is running at idling speed, for which it can no longer supply any substantial power, electro-magnet F, which is no longer fed with current from the dynamo, allows pawl 12 to be disengaged by spring 78. Spring 9 automatically and instantaneously brings back the control member E into the position corresponding to the lower ratio, that is to say R. Further on, I will explain how this system can be corrected.

In order to be able to increase the ratio of transmission, that is to say shift to higher gear, I provide, pivoted about the axis of member E, a lever 20, applied against a stop 70 and carrying, at its end 21, a pawl 22, always applied against the teeth of wheel 10 by a spring such as blade 23. This pawl is arranged to cooperate with the teeth of wheel 10. But normally a stationary guide 24 brings it out of action. This guide, which is more especially shown by Fig. 2, in which the parts where it projects from the teeth are cross hatched, includes an inclined surface 61 which uncovers two successive teeth of the wheel, and this from the position of rest of pawl 22 (position shown by Fig. 1).

Lever 20 is actuated through a connecting rod 25, through a suitable mechanism, for instance operative by the suction of the engine in the following manner:

A vessel having a deformable wall is constituted on the one hand by a rigid wall 26 and on the other hand by a flexible membrane 27, the periphery of which is caught against wall 26 and the center of which is fixed to rod 25. A pipe 28 connects this vessel with the suction pipe 29 of the carburetter. When mechanism G is subjected to the suction existing in this pipe, the membrane is moved toward wall 26. It drives rod 25 and thereby causes lever 20 to rotate. During a first part of its displacement, pawl 22 moves toward, and reaches, the tooth 30 of the ratchet wheel, against which it bears, owing to the recessed portion 61 of guide 24. Then, said pawl pushes this tooth a distance corresponding to one division, until it bears upon the projecting portion 31 of the guide 24. Finally, the ratchet wheel has turned through an angle corresponding to a single tooth, and member E has been brought into the next characteristic position (changing to a higher gear), despite the action of pawl 12, pushed by electro-magnet F, the action of which, analogous to that of a spring, has permitted the movement in this direction. For every action of the suction, I thus obtain the switching to the next higher gear.

It should be noted that apparatus G in the preferred form is not connected directly to pipe 29. As a matter of fact, owing to the presence of spring 32, which partly neutralizes the effect of the suction, by pushing flexible membrane 27 away from wall 26, the displacement of pawl 22 can take place only when the suction assumes a sufficiently high value, that is to say practically only when throttle pedal D is allowed to turn to a sufficiently high position by the driver. For any other value of the speed of the engine, the suction would be insufficient for acting.

It is preferable to provide a distributing member H, adapted to permit the suction to act only when the driver wants it. In this case, one may provide, for changing to higher gear, a special movement of the throttle pedal and I proceed, for instance in the following manner:

The pivoting axis 1 of the throttle pedal D is fitted with a certain lateral play with respect to its support, in such manner as to enable it to slide along its axis. The foot portion 34 of this pedal is fitted with an edge or flange 35, which enables the driver to produce this sliding displacement by a lateral movement of the foot.

I may as shown by Fig. 1, arrange a lever 36, pivoted about an axis 37, vertical in the drawing, said lever cooperating with another lever disposed at right angles thereto and to the plane of the drawing, said second mentioned lever acting on distributing member H.

The distributing member H is thus actuated by an axial displacement of spindle 1.

This distributing member H includes a cylindrical body, in which can slide a slide-valve 39, provided with two piston elements 40 and 41, capable of cooperating, one with an orifice 42 and the other with an orifice 43. Orifice 42 communicates with the suction of the engine, and orifice 43 communicates with the atmosphere.

Tube 28, which leads to mechanism G is never stopped by either of these two pistons. A spring 44 urges the slide valve toward the position shown by the drawing in which position no suction is supplied to mechanism G.

The operation of this particular mechanism is the following:

When the driver exerts no lateral action on the throttle pedal, the mechanism G is not subjected to the suction of the engine. There is no change to a higher gear, whatever be the value of the suction. But if, by a lateral action exerted on portion 35 of the pedal, the driver causes shaft 1 to slide axially, the slide valve 39 of the distributing member H, moved toward the left hand side of the drawing, allows the suction of the engine to act on membrane 27, by opening orifice 42 and closing orifice 43. Under the action of the suction, mechanism G causes a shifting to a higher gear. When the driver ceases to exert a lateral push on the portion 35 of the throttle pedal, the whole comes back, under the effect of spring 44, into the position shown by Fig. 1.

Fig. 5 shows a modified device for the same purpose, in which the member H is directly aligned with the end of shaft 1 so that movement of shaft 1 in the direction of its axis operates the valve H.

Fig. 6 shows an analogous device, for the control of distributing device H, which avoids the necessity of imparting an axial sliding movement to spindle 1. The portion 34 of the throttle pedal D is no longer provided with a projecting edge. This edge 35a is carried by the end of a separate lever 67, pivoted for instance about fixed point 68. When the driver laterally pushes element 35a, he moves, in the opposite direction, the end 69 of lever 67 and it is sufficient to locate the distributing device H in a suitable position, opposite this end of lever 67, for causing the engine suction to act as above explained. But the spindle 1 of the pedal no longer has an axial sliding displacement.

I will now explain how I obtain changing into lower gear. It is desired to obtain this through a downward movement of the throttle pedal, produced by the driver beyond the position that corresponds to the full power of the engine. It is therefore necessary, for this purpose, that the abutment placed on the carburetter in this position should not stop the throttle pedal. For this purpose, I arrange connecting rod 3 in such manner that it can slide in the knuckle 48 provided at the end of lever 4. Then said rod is provided with an abutment 45, a spring 46 and another abutment 47. In this way, the throttle, when it is stopped in the fully opened position thereof, permits a further movement (secondary stroke) of the throttle pedal by compression of spring 46. This arrangement is a modification of the system including a lever with a flexible blade described in my prior patent above referred to.

On the other hand, I provide, free to rotate on spindle 1, a lever 49 one end 50 of which carries an adjustable stop 51 capable of cooperating, in a position near to the fully opened position of the throttle valve, with lever 2, or any other piece moving together with the throttle pedal. Beyond this position, lever 49 is driven by the secondary stroke of the throttle pedal, which is made possible by the provision of spring 46.

On the pivoting spindle 13 of pawl 12, I provide another pawl 52, free to move about said spindle and capable also of retaining ratchet wheel 10, against the action of spring 9, owing to nose 55, but kept out of action by a stationary stop 53, against which it is applied by a spring 54. This last mentioned pawl is arranged in such manner that its nose 55, when it is brought toward wheel 10, is located half-way between two teeth when pawl 12 is applied against another tooth (position shown by Fig. 1). This pawl 52 carries another abutment 56, adapted to cooperate with pawl 12 and capable of disengaging pawl 12 from the teeth of wheel 10, when pawl 52 engages therewith.

The operation of this device takes place as follows:

As long as the driver does not use the secondary stroke of the throttle pedal, things occur, as above described, and only switching to higher gear is possible, as above explained.

If the driver uses the secondary stroke of the pedal, lever 2, coming into contact with abutment 51, pushes the end 57 of lever 49 in such manner as to engage the nose 55 of pawl 52 with the teeth, which produces, through abutment 56, the disengagement of pawl 12. Under the action of spring 3, the ratchet wheel and member E turn through an angle corresponding to one half of a tooth in the direction corresponding to changing to lower gear (lower gear ratio). Then they are stopped by the nose 55 of pawl 52. At this time, the driver relieves the throttle pedal and permits it to return, which causes lever 49 to turn rearwardly, brings pawl 52 into inoperative position and brings pawl 12 into operative position, under the action of electromagnet F. Spring 9 can then turn the ratchet wheel through an angle corresponding to one half of a tooth in the same direction, so that, finally, apparatus E having moved through an angle corresponding to a whole tooth, has come into the characteristic position corresponding to the next lower gear.

If the driver wishes to pass to still another lower gear, it is sufficient to repeat the same operation.

Concerning the passing to higher gear, it should be noted that the position of throttle pedal D, which operates distributing device H can be chosen beyond the maximum closing of the throttle valve 5 of the carburettor. For this purpose, it is sufficient to provide a play of connecting rod 3 permitting pedal D to rise beyond this position. It is only at this time that lever 2 can come into contact with the extension 45 of the slide valve of the distributing device H (Fig. 1) and can cause a passing to a higher gear.

Up to now I have spoken merely of passing into the next lower or higher gear. But this should be understood in a broad manner, as the invention might, for instance, be applied to a continuously variable ratio transmission. As a matter of fact, in this case, I can choose, within the whole possible range, a plurality of particular ratios of transmission, as numerous and close to each other as it may be desired, to which correspond the characteristic positions of apparatus E. Therefore, there is no discrepancy in the terms that are employed.

Up to now, the operation of the apparatus above described is the following:

Changing to a higher gear is obtained by wholly releasing the throttle pedal or alternately by placing it into a particular characteristic position (for instance sliding movement thereof in the axial direction of its pivot).

Changing to a lower gear is limited to a passing, by the action of the driver, to a lower gear ratio, by depressing (secondary stroke) the throttle pedal beyond the position corresponding to maximum power.

Automatic changing to an extreme lowest ratio of transmission as soon as the speed of the engine drops below a minimum value (action of electro-magnet F and pawl 12).

It is necessary that the ratio obtained in this last case should not necessarily be the extreme ratio, but should, on the contrary, be chosen by the driver. In any case, at least reverse gear and neutral must not be utilized without the will of the driver.

For this purpose, the driver can act upon a lever 8, which it is possible to fix in the desired position, for instance owing to a flexibility of this lever, which can penetrate into suitable notches, such as 58. These notches are visible in Fig. 3, which shows, in plan view, the arrangement of sector 59, lever 8 being supposed to have been cut flush with the sector. Lever 7, which is connected with member E through flexible transmission 6, is provided with a projection 60 which prevents it from moving, toward the left hand side of the drawing, beyond the position given to lever 8 by the driver and in which it is held, for instance, by notches 58. It is thus possible to prevent, when the engine slows down, the transmission from passing into reverse gear, merely by placing lever 8 opposite mark O. And if the driver places lever 8 opposite mark I or mark II, the ratio of transmission will never drop below the values corresponding to these positions.

Finally, lever 7 may constitute, as shown by Fig. 3, a device indicating the ratio that is utilized, since, for each change of gear, it moves together with member E. And I may place, opposite said lever 7, a band carrying indications corresponding to the position, as shown by Fig. 3, so that the driver is always exactly informed of the gear ratio that is engaged.

Of course, the invention is not limited to the embodiment above described. For instance, the electro-magnetic apparatus F might be replaced by any other suitable arrangement. The suction apparatus G might be given any other suitable form, and it might be operated by any other motive fluid, controlled by the distributing device H.

Likewise, pawls 12, 22 and 52 might be given any other form.

I may even, as shown by Fig. 4, eliminate the use of any external energy for passing to a higher gear. This possibility is of course limited to the case in which the displacement of member E, which controls the ratio of transmission, requires but very slight efforts, which can be supplied by the return spring of the throttle. In this embodiment of the invention, I make use, without modification, of ratchet wheel 10 and its guide 24, of lever 20 and its pawl 22, of pawls 12 and 52 and of electro-magnet F. Lever 49 is arranged in such manner that it includes two abutments 51a and 63 which cooperate respectively with the throttle pedal D when the latter is nearing its extreme positions. It follows that when said pedal is nearing its extreme lower position, lever 49 acts on pawl 52, exactly as in the first described embodiment. At the same time, pawl 22 is moved toward the left hand side of the drawing, on the part of guide 24 which renders it inoperative. Therefore passing to a lower gear is not modified. And when abutment 63 cooperates with pedal D, at the end of the upward movement of the latter, lever 20 receives, through connecting rod 62 pivoted to the end 57 of lever 49, the driving impulse which, in the first described embodiment, was supplied by the suction mechanism G. Therefore, the changing to a higher gear takes place in the same manner as above described, but without employing any external energy.

It may also happen that the effort necessary for actuating the control member E, which determines the value of the ratio of transmission, is too high for being supplied by the return spring of the throttle.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. In a system including an engine, a variable ratio transmission mechanism connected to said engine, means for controlling the power supplied by said engine, said means being adjustable within an operative range disposed between two limits at one of which said power is at a maximum while at the other it is at a minimum, a movable member for controlling the transmission ratio of said transmission mechanism adapted to assume a plurality of characteristic positions, elastic means for urging said member toward the position thereof corresponding to a predetermined low gear, movable stop means for opposing, when in operative position, actuation of said transmission control member by said elastic means, means, operative by said power control means when the latter is in a position adjacent the first mentioned limit, for temporarily bringing said stop means out of action and for limiting the resulting movement of said transmission control member by said elastic means to a displacement into the next lower characteristic position, and means, responsive to the speed of said engine, for automatically bringing said stop means out of action when said speed drops below a predetermined value.

2. In a system including an engine, a variable ratio transmission mechanism connected to said engine, means for controlling the power supplied by said engine, said means being adjustable within an operative range disposed between two limits at one of which said power is at a maximum while at the other it is at a minimum, a movable member for controlling the transmission ratio of said transmission mechanism adapted to assume a plurality of characteristic positions, elastic means for urging said member toward the position thereof corresponding to a predetermined low gear, movable stop means for opposing, when in active position, actuation of said transmission control member by said elastic means, spring means for urging said stop means toward inactive position, means, operative by said power control means when the latter is in a position adjacent the first mentioned limit, for temporarily bringing said stop means out of action and for limiting the resulting movement of said transmission control member by said elastic means to a displacement into the next lower characteristic position, a dynamo for said system driven by said engine, and an electro-magnet fed with current by said dynamo for normally keeping said stop means in active position and allowing said stop means to come into inactive position under the action of said spring means when the engine speed drops below a predetermined value.

3. In a system including an engine, a variable ratio transmission mechanism connected to said engine, means for controlling the power supplied by said engine, said means being adjustable within an operative range disposed between two limits at one of which said power is at a maximum while at the other it is at a minimum, a rotatable member for controlling the transmission ratio of said transmission mechanism adapted to assume a plurality of characteristic positions, elastic means for urging said member toward the position thereof corresponding to a predetermined low gear, a ratchet wheel rigid with said member, a pawl pivoted to a stationary part of the system adapted, when in active position, to cooperate with said ratchet wheel for preventing rotation thereof under the effect of said elastic means, spring means for urging said pawl toward the inactive position thereof, means, operative by said power control means when the latter is in a position adjacent the first mentioned limit, for temporarily bringing said pawl out of action and for limiting the resulting movement of said transmission control member by said elastic means to a rotation to the next lower characteristic position, a dynamo for said system driven by said engine, and an electro-magnet fed with current by said dynamo for normally keeping said pawl in active position and allowing said pawl to come into inactive position under the action of said spring means when the engine speed drops below a predetermined value.

4. In a system including an engine, a variable ratio transmission mechanism connected to said engine, means for controlling the power supplied by said engine, said means being adjustable within an operative range disposed between two limits at one of which said power is at a maximum while at the other it is at a minimum, a movable member for controlling the transmission ratio of said transmission mechanism adapted to assume a plurality of characteristic positions, elastic means for urging said member toward the position thereof corresponding to a predetermined low gear, movable stop means for opposing, when in active position, actuation of said transmission control member by said elastic means, means, operative by said power control means when the latter is in a position adjacent the first mentioned limit, for temporarily bringing said stop means out of action and for limiting the resulting movement of said transmission control member by said elastic means to a displacement to the next lower characteristic position, means, responsive to the speed of the engine, for automatically bringing said stop means out of action when said speed drops below a predetermined value, and means for rotating said transmission control member in a direction opposed to that in which it is urged by said elastic means.

5. In a system including an engine, a variable ratio transmission mechanism connected to said engine, means for controlling the power supplied by said engine, said means being adjustable within an operative range disposed between two limits at one of which said power is at a maximum while at the other it is at a minimum, a movable member for controlling the transmission ratio of said transmission mechanism, adapted to assume a plurality of characteristic positions, elastic means for urging said member toward the position thereof corresponding to a predetermined low gear, movable stop means for opposing, when in active position, actuation of said transmission control member by said elastic means, means, operative by said power control means when the latter is in a position adjacent the first mentioned limit, for temporarily bringing said stop means out of action and for limiting the resulting movement of said transmission control member by said elastic means to a displacement to the next lower characteristic position, means, responsive to the speed of the engine, for automatically bringing said stop means out of action when said speed drops below a predetermined value, motive means for rotating said transmission control member in a direction opposed to that in which it is urged by said elastic means, and means for holding said motive means out of engagement with said control member when said motive means are not to be operated.

6. In a system including an internal combustion engine, a variable ratio transmission mechanism connected to said engine, a throttle valve for controlling the power supplied by said engine, said valve being adjustable within an operative range of movement having two limits at one of which said power is at a maximum while at the other it is at a minimum, a throttle control for said throttle valve, a movable member for controlling the transmission ratio of said transmission mechanism, adapted to assume a plurality of characteristic positions, elastic means for urging said member toward the position thereof corresponding to a predetermined low gear, movable stop means for opposing, when in active position, actuation of said transmission control member by said elastic means, means, operative by said throttle control when the latter is in a position adjacent that corresponding to the first mentioned limit, for temporarily bringing said stop means out of action and for limiting the resulting displacement of said transmission control member by said elastic means to a shifting to the next lower characteristic position, and means, responsive to the engine speed, for automatically bringing said stop means out of action when said speed drops below a predetermined value.

7. In a system including an internal combustion engine, a variable ratio transmission mechanism connected to said engine, a throttle valve for controlling the power supplied by said engine, said valve being adjustable within an operative range having two limits, at one of which, corresponding to full opening, said power is at a maximum, while at the other, corresponding to closed position of said throttle, it is at a minimum, a movable throttle control for said throttle valve, a movable member for controlling the transmission ratio of said transmission mechanism adapted to assume a plurality of characteristic positions, elastic means for urging said member toward the position thereof corresponding to a predetermined low gear, movable stop means for opposing, when in active position, actuation of said transmission control member by said elastic means, means, operative by said throttle control when the latter is in a position beyond that corresponding to full opening of the throttle valve, for temporarily bringing said stop means out of action and for limiting the resulting displacement of said transmission control member by said elastic means to a shifting to the next lower characteristic position, and means, responsive to the engine speed, for automatically bringing said stop means out of action when said speed drops below a predetermined value.

8. In a system including an internal combustion engine, a variable ratio transmission mechanism connected to said engine, a throttle valve for controlling the power supplied by said engine, said valve being adjustable within an operative range having two limits, at one of which, corresponding to full opening, said power is at a maximum, while at the other, corresponding to closed position of said throttle, it is at a minimum, a movable throttle control for said throttle valve, a movable member for controlling the transmission ratio of said transmission mechanism adapted to assume a plurality of characteristic positions, elastic means for urging said member toward the position thereof corresponding to a predetermined low gear, movable stop means for opposing, when in active position, actuation of said transmission control member by said elastic means, means, operative by said throttle control when the latter is in a position beyond that corresponding to full opening of the throttle valve, for temporarily bringing said stop means out of action and for limiting the resulting displacement of said transmission control member by said elastic means to a shifting to the next lower characteristic position, means, responsive to the engine speed, for automatically bringing said stop means out of action when said speed drops below a predetermined value, motive means for rotating said transmission control member in a direction opposed to that in which it is urged by said elastic means, and means for holding said motive means, when not in operation, out of engagement with said transmission control member, so as to permit displacement thereof by said elastic means.

9. A combination according to claim 8 in which said motive means are operated upon a variation in fluid pressure responsive to variations in the operating condition of the engine.

10. In a system including an internal combustion engine, a variable ratio transmission mechanism connected to said engine, a throttle valve for controlling the power supplied by said engine, said valve being adjustable within an operative range having two limits at one of which, corresponding to full opening, said power is at a maximum, while at the other, corresponding to the closed position of said throttle, it is at a minimum, a movable throttle control for said throttle valve, a movable member for controlling the transmission ratio of said transmission mechanism adapted to assume a plurality of characteristic positions, elastic means for urging said member toward the position thereof corresponding to a predetermined low gear, movable stop means for opposing, when in active position, actuation of said transmission control member by said elastic means, means, operative by said throttle control when the latter is in a position beyond that corresponding to full opening of the throttle valve, for temporarily bringing said stop means out of action and for limiting the resulting displacement of said transmission control member by said elastic means to a shifting to the next lower characteristic positions, means, responsive to the engine speed, for automatically bringing said stop means out of action when said speed drops below a predetermined value, motive means, operative by the suction of said engine, for rotating said transmission control member in a direction opposed to that in which it is urged by said elastic means, and means for holding said motive means, when not in operation, out of engagement with said transmission control member, so as to permit displacement of said member by said elastic means.

11. In a system including an internal combustion engine, a variable ratio transmission mechanism connected to said engine, a throttle valve for controlling the power supplied by said engine, said valve being adjustable within an operative range having two limits at one of which, corresponding to full opening, said power is at a maximum, while at the other, corresponding to the closed position of said throttle, it is at a minimum, a movable throttle control for said throttle valve, a movable member for controlling the transmission ratio of said transmission mechanism adapted to assume a plurality of characteristic positions, elastic means for urging said member toward the position thereof corresponding to a predetermined low gear, movable stop means for opposing, when in active position, actuation of said transmission control member by said elastic means, means, operative by said throttle control when the latter is in a position beyond that corresponding to full opening of the throttle valve, for temporarily bringing said stop means out of action and for limiting the resulting displacement of said transmission control member by said elastic means to a shifting to the next lower characteristic position, means, responsive to the engine speed, for automatically bringing said stop means out of action when said speed drops below a predetermined value, said engine having means creating a suction, motive means, operative by the suction of the suction creating means, for rotating said transmission control member in a direction opposed to that in which it is urged by said elastic means, means adapted to be operated by the driver of the system, for controlling the communication of said motive means with said suction creating means, and means for holding said motive means, when not in operation, out of engagement with said transmission control member, so as to permit displacement of said member by said elastic means.

12. A combination according to claim 11 in which said throttle control is a throttle pedal, the means for controlling communication of said motive means with the suction creating means being operatively connected with said pedal.

13. In a system including an internal combustion engine, a variable ratio transmission mechanism connected to said engine, a throttle valve for controlling the power supplied by said engine, said valve being adjustable within an operative range having two limits at one of which, corresponding to full opening, said power is at a maximum, while at the other, corresponding to the closed position of said throttle, it is at a minimum, a throttle pedal for controlling said throttle valve, a spring for urging said pedal toward the position thereof corresponding to closing of the throttle valve, a movable member for controlling the transmission ratio of said transmission mechanism adapted to assume a plurality of characteristic positions, elastic means for urging said member toward the position thereof corresponding to a predetermined low gear, movable stop means for opposing, when in active position, actuation of said transmission control member by said elastic means, means, operative by said throttle pedal when the latter is in a position beyond that corresponding to full opening of the throttle valve, for temporarily bringing said stop means out of action and for limiting the resulting displacement of said transmission control member by said elastic means to a shifting into the next lower characteristic position, means, responsive to the engine speed, for automatically bringing said stop means out of action when said speed drops below a predetermined value, and motive means, operative by the displacement of said throttle pedal beyond the position thereof corresponding to the closing of the throttle valve, for rotating said transmission control member in a direction opposed to that in which it is urged by said elastic means, and means for holding said motive means, when not in operation, out of engagement with said transmission control member, so as to permit displacement of said member by said elastic means.

14. In a system including an internal combustion engine, a variable ratio transmission mechanism connected to said engine, a throttle valve for controlling the power supplied by said engine, said valve being adjustable within an operative range having two limits at one of which, corresponding to full opening, said power is at a maximum, while at the other, corresponding to the closed position of said throttle, it is at a minimum, a movable throttle control for said throttle valve, a movable member for controlling the transmission ratio of said transmission mechanism adapted to assume a plurality of characteristic positions, elastic means for urging said member toward the position thereof corresponding to a predetermined low gear, movable stop means for opposing, when in active position, actuation of said transmission control member by said elastic means, means, operative by said throttle control when the latter is in a position beyond that corresponding to full opening of said throttle valve, for temporarily bringing said stop means out of action and for limiting the resulting displacement of said transmission control member by said elastic means to a shifting to the next lower characteristic position, means, responsive to the engine speed, for automatically bringing said stop means out of action when said speed drops below a predetermined value, motive means, operative by the driver of the system, for rotating said transmission control member in a direction opposed to that in which it is urged by said elastic means, and means for holding said motive means, when not in operation, out of engagement with said transmission control member, so as to permit displacement of said transmission control member by said elastic means.

15. A combination according to claim 14 further including a part arranged adjacent said throttle control, for actuating said motive means.

16. A combination according to claim 5 in which said motive means include a pawl, means responsive to variations of at least one functional factor of the engine to operate said pawl, and a ratchet wheel movable together with said transmission control member, the teeth of said ratchet wheel being so inclined as to produce, under the effect of the impulses imparted thereto by said pawl, a rotation in a direction opposed to that corresponding to the displacement of said control member by said elastic means.

17. A combination according to claim 1 further including means for determining the lowest characteristic position below which said transmission control member cannot turn when automatically released by the means responsive to the speed of the engine.

18. A combination according to claim 1 further including means for determining the lowest characteristic position below which said transmission control member cannot turn when automatically released by the means responsive to the speed of the engine, and a part associated with said last mentioned means for indicating the gear that is actually in operation.

GASTON FLEISCHEL.